Patented Aug. 3, 1954

2,685,539

UNITED STATES PATENT OFFICE 2,685,539

REFRACTORY CARBON AND METHOD OF PRODUCING THE SAME

James Woodburn, Grand Island, and Rawley F. Lynch, Niagara Falls, N. Y., assignors to Great Lakes Carbon Corporation, New York, N. Y., a corporation of Delaware No Drawing. Application December 21, 1951, Serial No. 262,904

26 Claims. (Cl. 117—169)

This invention relates to refractory and oxidation-resistant carbon and graphite compositions. More particularly, this invention relates to carbon and graphite bodies containing in the pores thereof a refractory composition comprising essentially aluminum phosphate compound which has the property of rendering the base carbonaceous material resistant to oxidation.

The use of massive carbon and graphite bodies as refractory material is of long standing in the art, and the application of such materials for the construction of furnace and runner linings, mold stock for the pouring or casting of molten metals and other hot molten compositions, is progressively increasing. In many of these applications, a major drawback in the use of carbon and graphite resides in the fact that it is not resistant to oxidation, particularly at temperatures in excess of 500° C. This condition is aggravated in the event that the molten or hot composition itself exerts an oxidizing effect upon the carbon; for example, in the casting of fused alumina. Also, the erosion effect of molten metals upon carbon and graphite is quite pronounced, particularly in an oxidizing atmosphere.

Various attempts have been made to improve the properties of carbon and graphite to render it more resistant to oxidation. For example, it has been the practice to impregnate carbon or graphite with carbonaceous material such as tar or pitch from coal or petroleum sources, or with certain natural or synthetic resinous compositions, followed by carbonizing the impregnant. This procedure increases the apparent density of the base carbon body and reduces its porosity. Such techniques have provided only a partial solution to the problem. In addition, they are quite expensive since the impregnated carbon bodies must be again baked to temperatures in excess of the ultimate service temperature of the carbon stock and for some purposes must be regraphitized to temperatures in excess of 2000° C.

It has also been proposed to impregnate carbon or graphite with phosphoric acid. While this reduces the oxidation of carbon or graphite at low temperatures, we have found that such treatment actually catalyzes oxidation at temperatures in excess of 600° C. Again, others have proposed to incorporate refractory materials; for example, compounds of aluminum, calcium, iron, magnesium, such as the phosphate salts of these metals, directly into the "green" mix prior to formation and baking of the carbon bodies. Such compositions are made up of a small amount of refractory, a small amount of carbonaceous binders such as coal tar or coal tar pitch and a major portion of carbon aggregate. Following an intensive mixing operation in order to evenly distribute the carbonaceous binder, the resulting composition is molded or extruded and baked to temperatures of around 1000° C. Although such compositions have been useful in the manufacture of arc-light carbons; we have found that they do not reduce the tendency toward oxidation, particularly at temperatures in excess of 600° C. Presumably, this is for the reason that the refractory material does not form a continuous phase throughout the baked carbon body, but rather is encased or occluded within a carbon matrix which results from thermal decomposition of the carbonaceous binder.

It is an object of this invention to provide novel materials of construction based upon carbon and graphite.

It is a further object of the invention to provide massive carbon and graphite bodies or articles having improved resistance to erosion by molten metals and to oxidation by the atmosphere or to hot chemicals which normally oxidize carbon or graphite.

It is a further object of the invention to provide mold-construction material based upon carbon and graphite which has marked resistance to oxidation, particularly up to temperatures of about 800° C.

The above objects as well as others which will become apparent upon understanding of the invention as herein described are achieved by impregnating or depositing in the pores of a previously formed massive carbon or graphite body a composition comprising essentially aluminum phosphate compound. We have further found that the ratio of $Al_2O_3$ to $P_2O_5$ in the aluminum phosphate compound impregnant is critical with respect to the ultimate oxidation-resistant properties of the final material. More particularly, we have found that the molar ratio of $Al_2O_3:P_2O_5$ in the aluminum phosphate compound must be between about 0.2:1 and about 0.8:1.

It should be understood at the outset that our invention contemplates a treatment by various techniques of previously formed, massive, amorphous (or "gas-baked") carbon and/or graphite with solutions which will deposit aluminum phosphate compound within the internal and surface pores of the base material as distinguished from adding aluminum phosphate compound to a "green" carbon mix followed by baking, the latter having been previously taught in the art.

We have found that carbon or graphite which contains aluminum phosphate compound having the previously mentioned molar ratio of $Al_2O_3:P_2O_5$ renders the base material resistant to the action of oxidizing gases and other agents such as fused alumina, to temperatures up to 800° or 850° C. We have found that oxidation of the base carbon or graphite material under such conditions may be reduced from one-fifth to one-tenth of the amount of oxidation which is observed when employing the untreated base material under similar conditions; the improvement is even greater when compared tto carbon or graphite bodies which have been treated with phosphoric acid or other refractory materials previously known in the art.

In a broad embodiment of the invention an amorphous carbon or graphite body is treated with a solution of aluminum phosphate compound wherein the molar ratio of $Al_2O_3:P_2O_5$ is between about 0.2:1 and about 0.8:1. This solution may contain various compounds which will deposit the required aluminum phosphate compound upon drying and heating of the resulting treated material; for example, at temperatures from 150° to 500° C. The resulting treated carbon base material is then dried for several hours at about 100° C. followed by a baking operation at temperatures up to 500° C. in order to insure that all of the solvent from the impregnating solution is removed and to decompose hydrated aluminum phosphate compounds.

The treatment of carbon or graphite with aluminum phosphate compound may be accomplished by various techniques according to our invention. Eminently satisfactory results and prolonged service-life of the final material are achieved by impregnation. This is accomplished by placing the carbon or graphite base material in a container which is subsequently evacuated to about 25-30 inches' mercury. After several minutes a solution containing (or capable of forming) aluminum phosphate compound is admitted after which the vessel is pressurized to effect partial or total impregnation of the available voids. Ordinarily, a period of 45-120 minutes will be sufficient for this operation. Alternatively, and where complete penetration or impregnation are not essential or necessary, the base carbon or graphite can be coated (as by brushing or spraying) or soaked with solutions which will deposit aluminum phosphate compound in the surface and/or sub-surface pores of the carbon or graphite. Alternatively, a combination of the foregoing methods can be employed.

The base carbon (or graphite) materials which are impregnated according to our novel process are adequately described, as to their methods of manufacture and properties, in Mantell, Industrial Carbon, second edition, 1946, particularly in chapters XIII and XVI. The methods of manufacturing the base carbon and graphite materials form no part of this invention. Ordinarily, the amorphous or "gas-baked" carbon which may be treated according to our novel process will have an apparent density (grams/cm.$^3$) of 1.4 to 1.6; the graphitic base material will have an apparent density in excess of 1.4 and preferably 1.6 to 1.8. The higher densities of the graphitic material are achieved by employing pitch impregnated gas-baked carbon which is subsequently graphitized.

In a specific embodiment of the invention, an aqueous solution of aluminum phosphate compound wherein the molar ratio of $Al_2O_3:P_2O_5$ is between about 0.2:1 and about 0.8:1, and preferably between about 0.4:1 to 0.6:1, is admitted to a previously evacuated vessel containing pieces of massive graphite having an apparent density of about 1.7. The system is then pressurized at about 100 lbs. per square inch for 45-120 minutes after which the resulting graphitic pieces are dried at 100° C. for 15 to 20 hours. The dried material is then heated at a temperature of 250° C. for 4 hours to insure that the specimen is completely dry. The resulting composition forms an excellent mold or casting stock in the pouring of fused alumina, glass, pig iron and other molten metals. The active or useful life of such a mold is at least two to three times that of regular graphite.

In preparing the solutions of aluminum phosphate compound used in the above embodiment of the invention, the following formulations have been found to be particularly useful:

A. Tribasic aluminum phosphate ($AlPO_4$) plus sufficient oxy acid of phosphorus (preferably o-phosphoric acid) or ammonium salt of a phosphoric acid to insure that the molar ratio of $Al_2O_3:P_2O_5$ is between about 0.2 to about 0.8.

B. Monobasic aluminum phosphate $$Al(H_2PO_4)_3$$

dissolved in aqueous hydrochloric acid.

C. Dibasic aluminum phosphate $$Al_2(HPO_4)_3$$

dissolved in aqueous hydrochloric acid.

D. Aluminum pyrophosphate $$Al_4(P_2O_7)_3$$

dissolved in hydrochloric acid.

E. Aluminum acid phosphate—$Al_2H_6(P_2O_7)_3$—dissolved in aqueous hydrochloric acid.

F. Aluminum metaphosphate—$Al(PO_3)_3$.

In addition to the above formulations, the present invention contemplates employing a solution containing aluminum halide such as $AlCl_3$, $AlBr_3$, $AlF_3$, along with at least one agent of the group consisting of the oxy acids of phosphorus, their anhydrides, ammonium salts and mixtures of such phosphatic materials, providing that the molar ratio of $Al_2O_3:P_2O_5$ in the solution is between about 0.2:1 and about 0.8:1. The term "acids of phosphorus" include ortho-, meta-, and pyrophosphoric acid; hypophosphoric acid; ortho-, pyro- and hypophosphorus acids and the anhydrides of such acids, for example $P_2O_3$, $P_2O_4$, $P_2O_5$ and mixtures thereof. Alternatively, the mono- and dibasic ammonium salts of the above acids and anhydrides can be employed along with the aluminum halide.

In a further embodiment of the invention an amorphous carbon or graphite body may be impregnated according to the method mentioned above by employing a "double-impregnation"

technique. This involves alternately impregnating the base material with a solution of at least one agent of the group consisting of the oxy acids of phosphorus, their anhydrides, ammonium salts and mixtures of such phosphatic materials, and another solution containing an aluminum salt, preferably an aluminum phosphate such as $AlPO_4$ dissolved in hydrochloric acid, or alternatively an aluminum halide such as $AlCl_3$ which is reactive with the phosphatic agent to form aluminum phosphate compound. The relative amounts of impregnating solutions admitted into the pores of the carbon base body are controlled so that the molar ratio of $Al_2O_3:P_2O_5$ of the final aluminum phosphate compound which is formed therein by interaction between the solutes is between about 0.2:1 and about 0.8:1 and preferably between 0.4:1 and 0.6:1. The various acids of phosphorus, phosphorus anhydrides and ammonium salts of such compositions as hereinbefore set forth are also applicable to this embodiment of the invention. We have found that a solution containing essentially ortho-phosphoric acid and another solution containing aluminum phosphate dissolved in hydrochloric acid are particularly effective in practicing this embodiment of the invention.

In practicing the invention in accordance with the "double-impregnation" technique, it is our practice to dry the carbon base material after each impregnation, usually at 100° C. but often at 250° C. prior to conducting the second impregnation which causes deposition of aluminum phosphate compound in the pores of the previously impregnated carbon body. The techniques of impregnation involving evacuation and pressurizing of the container is substantially as set forth hereinabove.

In a further embodiment of the invention massive carbon and/or graphite pieces are treated with solutions which will contain (or which will deposit in the pores of the base material under heat treatment) aluminum phosphate compound by employing sub-surface treatment techniques. These may involve applying the solutions to the base material by immersion and soaking; by brushing; or by spraying. These treatments will be of sufficient duration, and the solutions in sufficient quantity to apply the solution to the surface or sub-surface portions of the base material in order to deposit therein a desired amount of aluminum phosphate compound. The "double-impregnation" technique can also be employed in connection with these procedures, and the carbon base material is usually dried at 100° C., and often at 250° C., between treatment with the individual solutions. While such techniques have been found to be useful for some applications, it will be obvious that the resulting compositions will be effective only as long as the surface or sub-surface remain substantially intact and unexposed to the action of oxidizing agents. For best results and optimum service life, we prefer to employ the previously described impregnation techniques.

In making up the impregnating solutions it is preferable to avoid inclusion therein of alkali metal salts; for example, sodium and potassium chlorides. It is known that sodium and potassium chlorides tend to increase the oxidation rate of carbon and graphite, and while traces or minor quantities of these may be tolerated in our novel compositions, their concentrations should be minimized.

In manufacturing the compositions described herein in accordance with our novel process, we contemplate employing one or a plurality of treatments, either with the "single" or "double" impregnation techniques or by spraying or soaking. For example, a solution of aluminum phosphate ($AlPO_4$) dissolved in phosphoric acid to give a molar ratio of $Al_2O_3:P_2O_5$ of between about 0.2:1 and about 0.8:1 can be used as the impregnating solution in several treatments of the carbon base material. We have found that two or three impregnations with solutions of aluminum phosphate compound result in a refractory carbon-base material which is particularly resistant to prolonged exposure (i. e. over two hours) to an oxidizing atmosphere at temperatures in excess of 700° C. Alternatively, when employing the "double" impregnation technique, a series of alternate impregnations can be conducted using any of the aforementioned phosphatic solutions and aluminum salt solutions reactive therewith to deposit aluminum phosphate compound in the pores of the carbon body. We have found that it is possible to effect four to five of such "double" impregnations with attendant significant increase in weight of the final, dried composition. Impregnations in excess of this number result in only minute increases in weight and are usually not justified from an economical standpoint.

The amount of aluminum phosphate compound (dry basis after heating to 250° C.) deposited in the base material will depend upon the ultimate use of the refractory product. Generally, from one to ten per cent by weight of the compound, based upon the carbon, will suffice.

In order to further illustrate the compositions and techniques which constitute the present invention, the following examples will be recited:

A series of solutions with various molar ratios of $Al_2O_3:P_2O_5$ of from 0 to 1.0 were prepared using 85% phosphoric acid ($H_3PO_4$) and/or aluminum phosphate ($AlPO_4$) powder and mixtures of these materials. All solutions were prepared to provide a solute concentration of 25% by weight; in some cases it was necessary to increase the acidity of the impregnant to effect solution of aluminum phosphate compound by means of hydrochloric acid. Sections of graphite (1.7 apparent density) were placed in a container which was evacuated to 29 inches' mercury, this condition being maintained for about 45 minutes. The impregnating solution was then admitted to the container in amounts sufficient to cover the graphite, and the system was returned to atmospheric pressure for 45 minutes in the case of a single impregnation and for 120 minutes in the case of two or three impregnations. The resulting impregnated graphite sections were dried at 100° C. for 15–20 hours and then heated at 250° C. for about four hours. We have found it to be essential that the drying operation be conducted rather carefully in order to avoid "sweating" of the graphite sections which results in exudation of the impregnant.

The heated pieces were quartered by machining and subjected to an oxidation test conducted as follows:

The treated graphite along with untreated material is placed in a laboratory muffle furnace on fire clay supports, the furnace having previously been brought up to test temperature. Air is admitted into the furnace at a rate of 2 liters per minute per sample, and the test is conducted for a certain prescribed length of time.

The results of the oxidation tests are set forth in Table I for single and double impregnations of graphite sections:

TABLE I

| Example No. | Molar Ratio $Al_2O_3:P_2O_5$ | No. of Impregnations | Percent Oxidation (by weight) | | | |
|---|---|---|---|---|---|---|
| | | | 750° C. | | | 850° C., 2 hrs. |
| | | | 1 hr. | 2 hrs. | 4 hrs. | |
| 1 | 0.0 | 1 | 12 | 20 | | 40 |
| 2 | 0.2 | 1 | 3 | 5 | | 16 |
| 3 | 0.4 | 1 | 1 | 3 | | 13 |
| 4 | 0.5 | 1 | 2 | 7 | | 16 |
| 5 | 0.6 | 1 | 2 | 7 | | 17 |
| 6 | 0.8 | 1 | 5 | 12 | | 18 |
| 7 | 1.0 | 1 | 22 | 48 | | 34 |
| 8 | 0.0 | 2 | 16 | 22 | 54 | 41 |
| 9 | 0.2 | 2 | 5 | 7 | 17 | 16 |
| 10 | 0.4 | 2 | 1 | 2 | 9 | 13 |
| 11 | 0.5 | 2 | 1 | 3 | 11 | 15 |
| 12 | 0.6 | 2 | 2 | 4 | 16 | 17 |
| 13 | 0.8 | 2 | 8 | 11 | 41 | 18 |
| 14 | 1.0 | 2 | 23 | 43 | 77 | 32 |
| Blank (untreated) | | | 6 | 14 | 42 | 30 |

In the following examples the graphite sections were impregnated three times with a solution containing aluminum phosphate and phosphoric acid (and hydrochloric acid where needed to effect solution) in the indicated ratios of $Al_2O_3:P_2O_5$.

TABLE II

| Example No. | Molar Ratio $Al_2O_3:P_2O_5$ | No. of Impregnations | Percent Oxidation (by weight) | | | |
|---|---|---|---|---|---|---|
| | | | 750° C. | | | 850° C., 2 hrs. |
| | | | 1 hr. | 2 hrs. | 4 hrs. | |
| 15 | 0.0 | 3 | 14 | 20 | 42 | 36 |
| 16 | 0.2 | 3 | 4 | 6 | 12 | 24 |
| 17 | 0.4 | 3 | 0.6 | 1.6 | 5 | 7 |
| 18 | 0.5 | 3 | 0.7 | 2 | 6 | 10 |
| 19 | 0.6 | 3 | 1 | 2 | 8 | 11 |
| 20 | 0.8 | 3 | 3 | 8 | 23 | 16 |
| 21 | 1.0 | 3 | 19 | 40 | 77 | 25 |
| Blank (Untreated) | | | 6 | 15 | 42 | 30 |

Table III summarizes the amount of solid impregnant (aluminum phosphate compound) or phosphoric acid, as the case may be, which was retained in the pores of the graphite after treatment and baking at 250° C.

TABLE III

| Example No. | No. of Impregnations | Percent Increast in Wt. (Av.) |
|---|---|---|
| 1 | 1 | 8 |
| 8 | 2 | 13 |
| 15 | 3 | 13 |
| 2–7 | 1 | 4 |
| 9–14 | 2 | 7–8 |
| 16–21 | 3 | 10 |

It will be seen from the above data that the amount of oxidation of the treated graphite, particularly where the molar ratio of $Al_2O_3:P_2O_5$ is between 0.4:1 and 0.6:1, has been reduced one-fourth to one-tenth that of the untreated material. It will further be seen that under oxidizing conditions at 850° C. there is a definite advantage in conducting two or more impregnations.

The above data further illustrate the fact that the use of o-phosphoric acid ($H_3PO_4$) in Examples 1, 8 and 15 and aluminum phosphate ($AlPO_4$) in Examples 7, 14 and 21 actually exert a catalytic effect upon the oxidation rate of graphite.

Example 22

A graphite section having an apparent density of 1.7 was impregnated with a saturated solution of diammonium phosphate—$(NH_4)_2HPO_4$—followed by a drying operation at 100° C. for 12 hours. The resulting piece was then impregnated with a saturated solution of aluminum chloride ($AlCl_3$) controlling the degree of saturation of this solution so that the resulting aluminum phosphate compound deposited in the pores of the graphite had a molar ratio of $Al_2O_3:P_2O_5$ of 0.5:1. After drying and baking as outlined in the previous examples, this material was subjected to air oxidation at 750° C. and this rate of oxidation determined to be about one-tenth that of the untreated material.

Example 23

The treatment described in Example 22 was repeated except that ammonium pyro-phosphate was substituted for the dibasic ammonium phosphate. The improvements in oxidation of the treated graphite were of the same order of magnitude.

Example 24

A suspension of alumina, $Al_2O_3$ or aluminum hydroxide—$Al(OH)_3$—in ortho-phosphoric acid was prepared and heated to 200° C. A sufficient amount of hydrochloric acid was added to effect solution. The molar ratio of $Al_2O_3:P_2O_5$ in this solution was 0.4:1. The resulting solution was employed as an impregnant in accordance with the process described for Examples 1–21. The per cent increase in weight (determined after heating at 250° C.) was about 5% for a single impregnation and about 8% for a double impregnation. The resistance to oxidation of the treated graphite at 750° C. was of the order of that obtained in Examples 3 and 10.

Example 25

A 38% by weight solution of dibasic ammonium phosphate in water and another solution containing 37% by weight aluminum chloride were used as impregnants in treating graphite sections having an apparent density of 1.67. Following the first impregnation with the dibasic ammonium phosphate solution and drying at 100° C. for 12 hours, the resulting piece was impregnated with aluminum chloride solution, controlling the amount of saturation by the latter solution so that the molar ratio of $Al_2O_3:P_2O_5$ was 0.5:1. Two of these cycles were employed, the pieces being dried at 100° C. after each impregnation. After heating at 250° C. to effect dehydration the treated graphite was tested for resistance to oxidation, the results being as follows (on a comparative basis, a value of 100 being assigned to the oxidation rate of graphite at 750° C.).

TABLE IV

|  | Oxidation (Percent Loss by Weight) | |
| --- | --- | --- |
|  | 750° C. | 800° C. |
| Untreated graphite | 100 | 300 |
| Treated graphite | 18 | 20 |

Example 26

The embodiment of the invention described in Example 25 was repeated except that three "double" or alternate impregnations were used employing dibasic ammonium phosphate solution and aluminum chloride solution, the molar ratio of $Al_2O_3:P_2O_5$ being 0.5:1. In an oxidation test at 800° C. the results were as follows:

TABLE V

|  | Wt. of Impregnant | Oxidation at 800° C.—Percent by Weight Loss | |
| --- | --- | --- | --- |
|  |  | 1 hr. | 2 hrs. |
| Untreated graphite | 0.0 | 31.6 | 44.0 |
| Treated graphite | 3.47 | 1.13 | 8.9 |

Example 27

The double impregnation techniques described in Examples 25 and 26 were used employing as the impregnation solutions a saturated solution of aluminum chloride ($AlCl_3$) and tri-ammonium phosphate—$(NH_4)_3PO_4$, controlling the gain in weight of the graphite from the impregnant so that in the resulting aluminum phosphate deposited in the pores of the graphite, the molar ratio of $Al_2O_3:P_2O_5$ was about 0.4:1. The total gain in weight of the graphite (after heating at 25° C.) was 4%. This material, when tested for oxidation resistance at 800° C., exhibited an oxidation rate one-tenth that of the untreated graphite.

Example 28

Samples of amorphous carbon brick having an apparent density of 1.55 were treated by the "double" impregnation technique employing dibasic ammonium phosphate and aluminum chloride solutions as previously described. The final treated bricks, containing 5% by weight of aluminum phosphate compound wherein the molar ratio of $Al_2O_3:P_2O_5$ was about 0.5:1, were tested for oxidation resistance at 750° C. The results are repeated in Table VI.

TABLE VI

|  | Oxidation at 750° C.—Percent by weight loss | | | |
| --- | --- | --- | --- | --- |
|  | 1 hr. | 2 hrs. | 3 hrs. | 4 hrs. |
| Untreated Carbon | 12.55 | 21.1 | 27.0 | 31.0 |
| Treated Carbon | 2.28 | 8.36 | 13.7 | 19.0 |

In order to illustrate the improved oxidation characteristics of these novel compositions prepared according to the methods of this invention, sections of amorphous or "gas-baked" carbon were prepared by the techniques set forth in the Mantell reference previously alluded to and containing 5% by weight of aluminum phosphate ($AlPO_4$) which was added to the "green" mix. The resulting compositions (Example 29) were baked to 950° C. and tested for oxidation resistance and compared to amorphous carbon (Example 30) and graphite (Example 31) sections which had been singly impregnated with a solution of aluminum phosphate in phosphoric acid wherein the ratio of $Al_2O_3:P_2O_5$ was 0.45:1. Oxidation tests were conducted on the resulting samples at 750° C., the results being reported in Table VII on a relative basis, a value of 1.0 being assigned to Example 31:

TABLE VII

| Example No. | Relative Oxidation Loss |
| --- | --- |
| Amorphous Carbon (untreated) | 13.4 |
| Graphite Blank (untreated) | 7.2 |
| 29 | 13.6 |
| 30 | 3.3 |
| 31 | 1.00 |

The above results show that the addition of aluminum phosphate ($AlPO_4$) powder to the green mix effects no improvement in oxidation resistance of the amorphous carbon. This can be demonstrated to carry over into the graphitized state, mainly for the reason that the aluminum phosphate is volatilized from the carbon at graphitization temperature.

It is to be understood that the above specific examples are recited merely by way of illustration and not by way of limitation. Nor is the invention limited to the specific solutions or combinations of reagents set forth. It should be understood that any combination of solutions which contain or which will form aluminum phosphate compounds in the claimed ratio of $Al_2O_3:P_2O_5$ either at atmospheric temperatures or pressures or at elevated temperatures or pressures will be employed within the scope of the invention. It should also be understood that volatile acids other than hydrochloric may be employed to effect substantial solution of aluminum phosphate compound in the treating solution.

We claim:

1. A carbon body of improved resistance to oxidation containing in the pores thereof a composition comprising essentially aluminum phosphate compound, the molar ratio of $Al_2O_3:P_2O_5$ in said compound being between about 0.2:1 and about 0.8:1.

2. A refractory, oxidation-resistant material consisting of a body of graphite and containing in the pores of said body a composition comprising essentially aluminum phosphate compound, the molar ratio of $Al_2O_3:P_2O_5$ in said compound being between about 0.2:1 and about 0.8:1.

3. A material according to claim 2 wherein the graphite has an apparent density in the range of 1.6 to 1.8 prior to placing aluminum phosphate compound in the pores of the graphite body.

4. A material according to claim 2 wherein the molar ratio of $Al_2O_3:P_2O_5$ is between about 0.4:1 and about 0.6:1.

5. A material according to claim 2 wherein the resulting graphitic body contains between about 1.0 and about 10.0% by weight of aluminum phosphate compound.

6. A material according to claim 2 wherein the ratio of $Al_2O_3:P_2O_5$ is between about 0.4:1 and about 0.6:1, and wherein the resulting graphitic body contains between about 1.0 and about 10.0% by weight of aluminum phosphate compound.

7. A refractory, oxidation-resistant material consisting of a body of gas-baked carbon and containing in the pores of said body a composition comprising essentially aluminum phosphate compound, the molar ratio of $Al_2O_3:P_2O_5$ in said compound being between about 0.2:1 and about 0.8:1.

8. A material according to claim 7 wherein the molar ratio of $Al_2O_3:P_2O_5$ is between about 0.4:1 and about 0.6:1.

9. A carbon body containing in the pores pores thereof a mixture of $AlPO_4$ and an oxy acid of phosphorus in amounts so that the molar ratio of $Al_2O_3:P_2O_5$ is between about 0.2:1 and about 0.8:1.

10. A carbon body according to claim 9 wherein the molar ratio of $Al_2O_3:P_2O_5$ is between about 0.4:1 and about 0.6:1.

11. A carbon body according to claim 9 wherein the oxy acid of phosphorus is o-phosphoric acid.

12. A method for producing an oxidation-resistant, refractory material which comprises impregnating a carbon body with a solution comprising essentially aluminum phosphate compound, the molar ratio of $Al_2O_3:P_2O_5$ in said compound being between about 0.2:1 and about 0.8:1, and drying the impregnated body to remove substantially all of the solvent therefrom.

13. A method for producing an oxidation-resistant, refractory material which comprises placing in the pores of a carbon body a solution comprising essentially aluminum phosphate compound, the molar ratio of $Al_2O_3:P_2O_5$ in said compound being between about 0.2:1 and about 0.8:1, and drying the impregnated body to remove substantially all of the solvent therefrom.

14. A method according to claim 13 wherein the molar ratio of $Al_2O_3:P_2O_5$ is between about 0.4:1 and about 0.6:1.

15. A method for improving the resistance to oxidation of a graphite body which comprises impregnating said body with a solution comprising essentially aluminum phosphate compound, the molar ratio of $Al_2O_3$ to $P_2O_5$ in said compound being between about 0.2:1 and about 0.8:1, and drying the impregnated body to remove substantially all of the solvent therefrom.

16. A method for improving the resistance to oxidation of a body of gas-baked carbon which comprises at least partially impregnating said body with a solution comprising essentially aluminum phosphate compound, the molar ratio of $Al_2O_3:P_2O_5$ in said compound being between about 0.2:1 and about 0.8:1, and drying the impregnated body to remove substantially all of the solvent therefrom.

17. A method according to claim 16 wherein the molar ratio of $Al_2O_3:P_2O_5$ is between about 0.4:1 and about 0.6:1.

18. The method according to claim 16 wherein the essential components of the impregnation solution consist essentially of aluminum phosphate ($AlPO_4$) and o-phosphoric acid in a molar ratio of $Al_2O_3:P_2O_5$ of between about 0.4:1 and about 0.6:1.

19. A method of improving the resistance to oxidation of a carbon body which comprises impregnating said body with a solution wherein the solute comprises essentially aluminum halide and at least one agent of the group consisting of the oxy acids of phosphorus, their anhydrides, their mono- and di-ammonium salts and mixtures thereof, the ratio of $Al_2O_3:P_2O_5$ in said solution being between about 0.2:1 and about 0.8:1, and drying the impregnated body to remove substantially all of the solvent therefrom.

20. The method according to claim 19 wherein the aluminum halide is aluminum chloride and the acid of phosphorus is o-phosphoric acid.

21. The method of claim 19 wherein the aluminum halide is aluminum chloride and the ammonium salt of the oxy acid of phosphorus is dibasic ammonium phosphate.

22. A method for improving the resistance to oxidation of a carbon body which comprises alternately impregnating said body with a solution of at least one agent of the group consisting of the oxy acids of phosphorus, their anhydrides, their mono- and di-ammonium salts and mixtures thereof and a solution of an aluminum halide to form aluminum phosphate compound, the amount of said solutions absorbed by said body being so controlled that the resulting aluminum phosphate compound formed in said body has a molar ratio of $Al_2O_3:P_2O_5$ of between about 0.2:1 and about 0.8:1, and drying the impregnated body to remove substantially all of the solvent therefrom.

23. The method according to claim 22 wherein the impregnation solutions contain aluminum chloride and dibasic ammonium phosphate in a molar ratio of $Al_2O_3:P_2O_5$ of between about 0.4:1 and about 0.6:1.

24. The method according to claim 22 wherein the impregnation solutions comprise essentially o-phosphoric acid and aluminum phosphate in hydrochloric acid.

25. A method for improving the resistance to oxidation of a carbon body which comprises applying thereto a solution comprising essentially aluminum phosphate compound, the molar ratio of $Al_2O_3:P_2O_5$ of said compound being between about 0.2:1 and about 0.8:1 and drying said body to remove the solvent therefrom.

26. A method for improving the resistance to oxidation of a carbon body which comprises impregnating said body with a solution wherein the solute comprises essentially aluminum halide and at least one agent of the group consisting of the oxy acids of phosphorus, their anhydrides, their mono- and di-ammonium salts and mixtures thereof, which solution, upon heating the resulting impregnated body to a temperature between about 150° to about 400° C., will deposit aluminum phosphate compound in the pores of said body, the molar ratio of $Al_2O_3:P_2O_5$ in said compound being between about 0.2:1 and about 0.8:1.

References Cited in the file of this patent

UNITED STATES PATENTS

| Number | Name | Date |
|---|---|---|
| 1,566,409 | Lavene | Dec. 22, 1925 |
| 1,773,105 | Jones et al. | Aug. 19, 1930 |
| 2,206,729 | Stalhane | July 2, 1940 |

FOREIGN PATENTS

| Number | Country | Date |
|---|---|---|
| 151,609 | Great Britain | Nov. 3, 1921 |

Certificate of Correction

Patent No. 2,685,539

August 3, 1954

James Woodburn et al.

It is hereby certified that error appears in the printed specification of the above numbered patent requiring correction as follows:

Column 9, line 75, for "25° C." read *250° C.*; column 11, line 45, strike out "pores";

and that the said Letters Patent should be read as corrected above.

Signed and sealed this 23rd day of November, A. D. 1954.

[SEAL]

ARTHUR W. CROCKER,
*Assistant Commissioner of Patents.*